US010257985B2

(12) United States Patent
Bonte et al.

(10) Patent No.: US 10,257,985 B2
(45) Date of Patent: Apr. 16, 2019

(54) RECTANGULAR BALER WITH IMPROVED TRANSMISSION OF FORCES TO THE CHASSIS

(71) Applicant: CNH Industrial America LLC, New Holland, PA (US)

(72) Inventors: Xavier G. J. M. Bonte, Sint Kruis (NL); Frederik Demon, Bruges (Sint-Kruis) (BE); Johan Dulst, Ichtegem (BE); Luigi Forghieri, Ghent (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/500,419

(22) PCT Filed: Jul. 23, 2015

(86) PCT No.: PCT/EP2015/066906
§ 371 (c)(1),
(2) Date: Jan. 30, 2017

(87) PCT Pub. No.: WO2016/016093
PCT Pub. Date: Feb. 4, 2016

(65) Prior Publication Data
US 2017/0223898 A1 Aug. 10, 2017

(30) Foreign Application Priority Data
Jul. 30, 2014 (BE) .................................. 2014/0591

(51) Int. Cl.
A01F 15/04 (2006.01)
A01F 15/08 (2006.01)

(52) U.S. Cl.
CPC ........ *A01F 15/042* (2013.01); *A01F 15/0841* (2013.01)

(58) Field of Classification Search
CPC .... A01F 15/042; A01F 15/0825; A01F 15/10; A01F 15/0841; A01F 2015/102;
(Continued)

(56) References Cited

U.S. PATENT DOCUMENTS 1,997,120 A 4/1935 Rickel
5,706,901 A 1/1998 Walters et al.
(Continued)

FOREIGN PATENT DOCUMENTS

DE 4018751 A1 12/1991
DE 19725699 A1 12/1998
(Continued)

*Primary Examiner* — Arpad Fabian-Kovacs
(74) *Attorney, Agent, or Firm* — Peter K. Zacharias; Patrick M. Sheldrake

(57) ABSTRACT

A rectangular baler including a chassis; a compacting plunger supported on the chassis for advancing crop material; and a bale chamber between the compacting plunger and the back end. The chassis is provided with a first and second sidewall extending from the front end in the direction of the back end. There is further provided a pull rod connecting the first sidewall and the second sidewall, at a location between the plunger and the front end. The pull rod has a first part and a second end part extending freely through a first hole in the first sidewall and a second hole in the second sidewall, respectively.

16 Claims, 3 Drawing Sheets

(58) Field of Classification Search
CPC .......... A01F 29/04; A01F 15/00; A01F 15/04; A01F 15/046; A01D 43/006; B30B 15/041; B30B 9/3032
See application file for complete search history.

(56) References Cited

U.S. PATENT DOCUMENTS

| | | | | |
|---|---|---|---|---|
| 6,457,405 | B1* | 10/2002 | Lippens | A01F 15/0825 100/192 |
| 6,732,774 | B1 | 5/2004 | Seckel | |
| 9,426,944 | B2* | 8/2016 | Naeyaert | A01F 15/10 |
| 9,861,041 | B2* | 1/2018 | Verhaeghe | A01F 15/042 |
| 2002/0043048 | A1 | 4/2002 | Roth et al. | |
| 2006/0283167 | A1 | 12/2006 | Kraus et al. | |
| 2011/0023435 | A1* | 2/2011 | Matousek | A01D 43/006 56/341 |
| 2011/0023436 | A1* | 2/2011 | Matousek | A01D 43/006 56/341 |
| 2011/0023437 | A1* | 2/2011 | Kendrick | A01D 43/006 56/341 |
| 2011/0023438 | A1* | 2/2011 | Matousek | A01D 43/06 56/341 |
| 2011/0023439 | A1* | 2/2011 | Kendrick | A01D 41/1243 56/341 |
| 2011/0023440 | A1* | 2/2011 | Matousek | A01F 15/0825 56/341 |
| 2012/0240793 | A1* | 9/2012 | Dedeurwaerder | A01F 15/042 100/3 |
| 2014/0123862 | A1* | 5/2014 | Siebenga | A01F 15/10 100/35 |
| 2014/0158002 | A1* | 6/2014 | O'Reilly | A01F 15/0841 100/188 R |
| 2014/0165859 | A1* | 6/2014 | O'Reilly | A01F 15/0841 100/179 |
| 2014/0305322 | A1* | 10/2014 | Galant | A01F 15/04 100/35 |
| 2015/0342120 | A1* | 12/2015 | O'Reilly | A01F 15/042 100/268 |
| 2016/0120129 | A1* | 5/2016 | Verhaeghe | A01F 15/0825 56/341 |
| 2017/0188519 | A1* | 7/2017 | Figger | A01F 15/042 |
| 2017/0215343 | A1* | 8/2017 | Demon | A01F 15/08 |
| 2017/0223899 | A1* | 8/2017 | Bonte | A01F 15/0825 |

FOREIGN PATENT DOCUMENTS

| | | | |
|---|---|---|---|
| EP | 1340421 A1 * | 9/2003 | .......... A01F 15/0841 |
| EP | 2570021 A1 | 3/2013 | |
| FR | 1257741 | 4/1961 | |
| GB | 2219722 A | 12/1989 | |
| WO | 2013186188 A1 | 12/2013 | |
| WO | 2013186221 A1 | 12/2013 | |

* cited by examiner

RECTANGULAR BALER WITH IMPROVED TRANSMISSION OF FORCES TO THE CHASSIS

CROSS REFERENCE TO RELATED APPLICATION

This application is the National Stage of International Application No. PCT/EP2015/066906 filed Jul. 23, 2015, which claims priority to Belgium Patent Application No. 2014/0591 filed Jul. 30, 2014, the contents of which are incorporated herein by reference.

FIELD OF INVENTION

The field of the invention relates to rectangular balers, and in particular to rectangular balers having a chassis provided with a first and second sidewall extending from a front end of the baler in the direction of a back end of the baler where the bales leave the baler.

BACKGROUND

In rectangular balers bales are formed by compressing crop material in a bale chamber by a plunger that reciprocates in the bale chamber. The baler is pulled by a tractor which is connected to the front end of the baler.

The forces from the draw bar on the chassis tend to "open" the first and second sidewalls which are connected to the chassis of the baler, especially at the top thereof. For that reason the sidewalls have to be connected or have to be capable to carry these loads. In known systems this is done by welding a transverse connection beam in between the first and second sidewall. However, such solutions result in high bending loads on the sidewalls.

SUMMARY

The object of embodiments of the invention is to provide a rectangular baler allowing for an improved transmission of forces to the chassis, and in particular avoiding high bending loads in the sidewalls.

According to a first aspect of the invention there is provided a rectangular baler comprising a chassis, a compacting plunger supported on the chassis, for advancing crop material, and a bale chamber between the compacting plunger and the back end, adapted to contain one or more bales. The chassis is provided with a first and second sidewall extending from the front end in the direction of the back end. There is provided a pull rod connecting the first sidewall and the second sidewall, at a location between the plunger and the front end. The pull rod has a first and a second end part extending freely through a first hole in said first sidewall and a second hole in said second sidewall, respectively. The first and second end parts of the pull rod are provided with a first and second blocking element preventing that said first and second end parts move through said first and second hole, respectively.

Embodiments of the invention are based inter alia on the inventive insight that the tendency to "open" the first and second sidewalls due to forces from the drawbar (comprising the front part of the first and second side walls) can be accurately dealt with by providing a pull bar at a suitable location between the first and the second sidewall. The pull bar may be located where the forces are transferred to a part of the sidewalls that is welded to the chassis.

In a preferred embodiment the pull rod connects an upper half of said first sidewall with an upper half of said second sidewall. More preferably the pull rod connects a top part of said first sidewall with a top part of said second sidewall.

In a preferred embodiment the first sidewall comprises a first pull wall portion at the front end and a first frame wall portion connected to the chassis. Similarly, the second sidewall comprises a second pull wall portion at the front end and a second frame wall portion connected to the chassis. The first and second pull wall portions are part of the so-called draw bar of the baler. The first and second frame wall portion is connected at a connection area to the first and second pull wall portion, respectively. The first hole extends through the first pull wall portion and the first frame wall portion at the connection area, and the second hole extends through the second pull wall portion and the second frame wall portion at the connection area. In that way the pull rod is arranged at the same area as where the draw bar is connected to the first and second frame wall portions which are fixed to the chassis, and hence bending loads are avoided or significantly reduced compared to prior art solutions where the connecting beam is provided offset of the connection area. The "opening" force is directly held by the pull rod and is not or only to a very small extent transferred to the chassis.

In other embodiments the first and second sidewall may be each formed as a single piece.

In a preferred embodiment the first and second sidewall each have a front end wall part and a back end wall part which is under an angle with respect to a front end wall part, such that the front end wall part of the first sidewall approaches the front end wall part of the second sidewall, when looking into the direction of the front end. Each front end wall part is connected via a transition area, typically a bending line, to the corresponding back end wall part. In an exemplary embodiment in which the first and second sidewall are formed as a first and second pull wall portion connected to a first and second frame wall portion, the first and second pull wall portion may have a first part which is bent with respect to a second part. The second part of the first and second pull wall portion is aligned with the first and second frame wall portion, respectively, such that the first parts constitute said front end wall parts, and the second parts together with the first and second frame wall portions constitute the back end wall parts.

Preferably, the pull rod is located at a distance from a plane through the transition zones which is smaller than 75 cm, preferably smaller than 50 cm. A position of the pull rod in or close to the transition area has the advantage that the forces on the draw bar, i.e. on the front end wall parts which tend to "open" the first and second sidewall are taken up in an area where these forces are typically the highest.

In a preferred embodiment the first and second sidewall are connected at the front end via a reinforced plate-like element, which plate-like element is provided with a hole for a PTO drive shaft.

In a further developed embodiment the first and second pull wall portion has a first part which is bent with respect to a second part, said second part being aligned with the first and second frame wall portion, respectively, and each first part makes an angle with each second part, such that the first pull wall portion of the first sidewall approaches the second pull wall portion of the second sidewall, when looking into the direction of the front end. Preferably, the first parts of said first and second pull wall portion are connected via a reinforced plate-like element, which plate-like element is provided with a hole for a PTO drive shaft.

In an exemplary embodiment the first and second frame wall portions are first and second double-walled portions, and the first and second pull wall portions have a first and second edge, respectively, which is arranged between the walls of the first and second double walled portion, respectively. The first hole and the second hole are formed as a through-hole extending through the walls of the first and second double walled portion and through the edge of the first and second pull wall portion, respectively. In that way a compact and strong structure is provided allowing the bending forces to be taken up in an appropriate manner.

In an exemplary embodiment the first and second pull wall portions have a first and second upper edge with a U-shape, wherein a hollow cylindrical part is fixed in the first and second U-shaped upper edge. The hollow cylindrical part of the first and second pull wall portion is part of the first and second hole, respectively.

In a further developed embodiment there is provided a first hollow bolt and a second hollow bolt arranged in the first hole and the second hole, respectively, wherein the first and second end part of the pull rod extends through said first and second bolt, respectively. In an embodiment where a hollow cylindrical part is fixed in the first and second pull wall portions, the hollow bolt may extend through the hollow cylindrical part.

In a preferred embodiment the first and second blocking element each comprise at least one nut, and the first and second end part are each provided with a screw thread corresponding with the screw thread of the nut.

In a preferred embodiment the baler further comprises a gearbox, and there is provided a carrying member between the first sidewall and the second sidewall. The carrying member supports a lower part of the gearbox. Preferably the carrying member is arranged between the first frame wall portion and the second frame wall portion, and such that the pull rod is arranged higher than the carrying member, and, seen in a top view, closer to the front end than the carrying member.

In an exemplary embodiment the pull rod has a cross sectional dimension which is smaller than 30 mm preferably the pull rod has a round cross section with a diameter which is smaller than 30 mm.

BRIEF DESCRIPTION OF THE FIGURES

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which.

DESCRIPTION OF EMBODIMENTS

Figure 1:
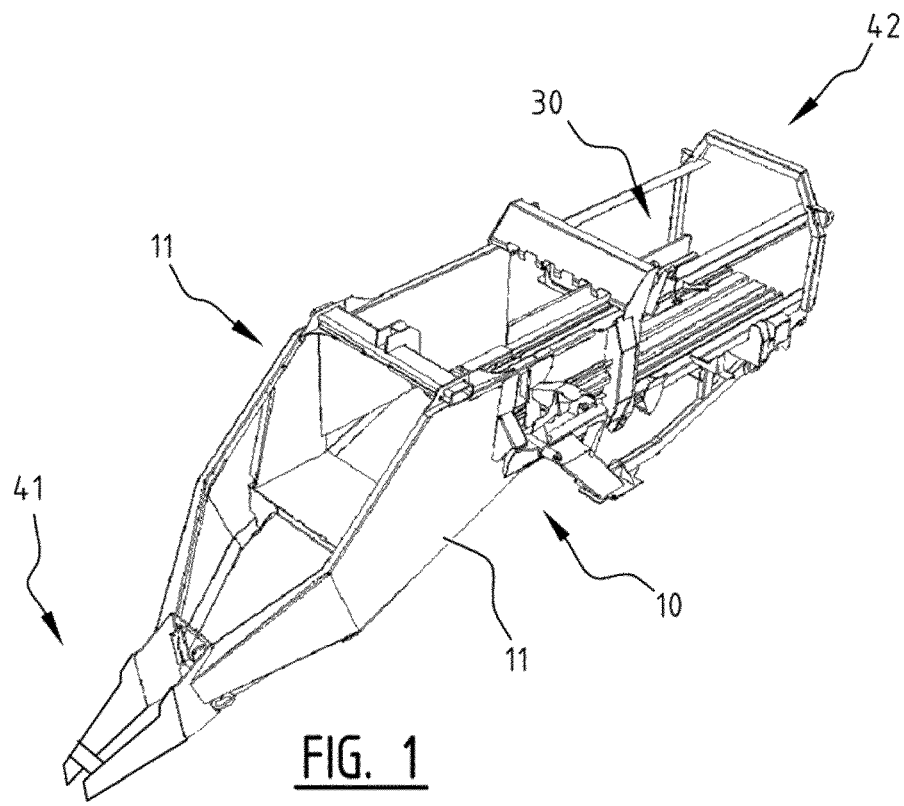
FIG. 1 illustrates a perspective view of an embodiment of a chassis of a baler.

The drawings are only schematic and are non-limiting. In the drawings, the size of some of the elements may be exaggerated and not drawn on scale for illustrative purposes.

Any reference signs in the claims shall not be construed as limiting the scope. In the drawings, the same reference signs refer to the same or analogous elements.

The terms "front", "rear", "forward", "rearward", "left" and "right" used throughout this description are determined with respect to the normal direction of travel of the machine in operation. However, they are not to be construed as limiting terms.

Embodiments of the present invention relate to rectangular balers of agricultural material such as hay, straw, silage or similar crop material that previously has been cut, windrowed or swathed, and is picked up from an agricultural field. The produced rectangular bales may have high density, hence a high mass, for example of 500 kg or more. The rectangular baler is designed to be towed by an agricultural tractor and powered by the tractor's power take-off.

FIG. 1 illustrates the chassis 10 of a baler. The chassis 10 is a welded construction onto which all parts are mounted. The baler has a longitudinal direction extending in the traveling direction of the baler between a front end 41 intended to be connected to a tractor and a back end 42 where the bales leave the baler. The baler comprises a baling chamber 30, a compacting plunger 20 (not shown in FIG. 1, but indicated in FIG. 5) supported on the chassis 10, for advancing crop material in said bale chamber 30.

FIGS. 2-5 illustrate in detail a front part of the chassis 10 according to an exemplary embodiment of the invention. The chassis is provided with a first and second sidewall 11 extending from the front end in the direction of the back end in the longitudinal direction of the baler. There is provided a pull rod 50 connecting the first sidewall and the second sidewall, at a location between the baling chamber 30 and the front end 41. The pull rod 50 connects a top part of the first sidewall 11 with a top part of the second sidewall 11. The pull rod 50 preferably has a diameter which is smaller than 30 mm.

Figure 4:
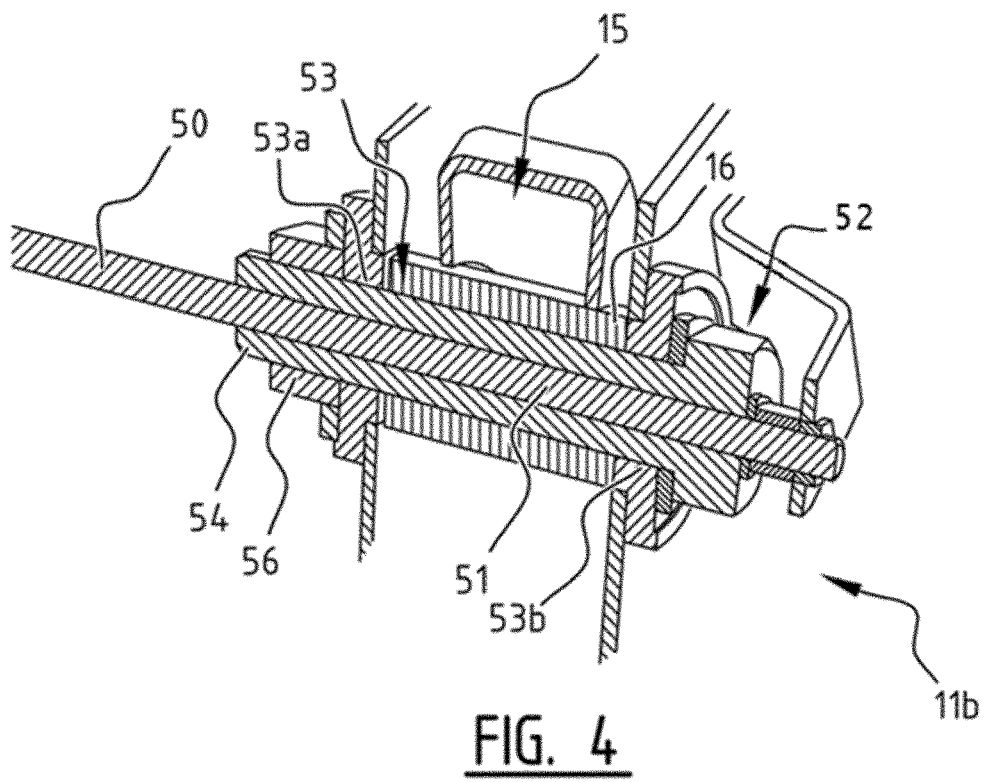
FIG. 4 is detailed perspective view of the connection of the pull rod to the sidewall for the embodiment of FIG. 2, showing a cross section along a transverse plane through the pull rod.

The pull rod has a first and a second end part 51 extending freely through a first hole 53 in said first sidewall 11 and a second hole 53 in said second sidewall 11, respectively, as is best illustrated in FIG. 4. The first and second end parts 51 of the pull rod 50 are provided with a first and second blocking element 52, in the form of two nuts, preventing that the first and second end parts 51 move through said first and second hole, respectively.

In the illustrated embodiment a hollow bolt in the form of a pen 54 is arranged in the first and second hole 53, and the end part 51 of the pull rod 50 extends through said hollow pen 54. The hollow pen 54 is provide with an outer screwthread and is fixed with a nut 56. The skilled person understands that other variants are possible, e.g. using a hollow bolt and two nuts to fix the hollow bolt, etc.

The first sidewall 11 comprises a first pull wall portion 11a at the front end 41 and a first frame wall portion 11b connected to the chassis 10. The second sidewall 11 comprises a second pull wall portion 11a at the front end 41 and a second frame wall portion 11b connected to the chassis 10. The first and second frame wall portion 11b is connected at a connection area 12 to the first and second pull wall portion 11a, respectively. The first (second) hole 53 extends through the first (second) pull wall portion 11a and the first (second) frame wall portion 11b at the connection area 12. In other non-illustrated embodiments the first and second sidewall may be constructed as a single piece (optionally comprising different portions that are welded to each other) instead of two portions which are bolted together.

The first (second) pull wall portion 11a has a first part 13 which is bent along a line 17 with respect to a second part 14. The second part 14 is aligned with the first (second) frame wall portion 11b. Each first part 13 makes an angle with each second part 14, such that the first pull wall portion 11a of the first sidewall 11 approaches the second pull wall portion 11a of the second sidewall 11, when looking into the direction of the front end 41. Preferably the distance between pull rod 50 and a plane through bending lines 17 is smaller than 75 cm, more preferably smaller than 50 cm. In that way the bending forces can be taken up adequately by the pull rod 50.

The first parts 13 of the first and second pull wall portions are connected via a reinforced plate-like element 60. The plate-like element 60 is provided with a hole 61 for a PTO drive shaft.

Figure 2:
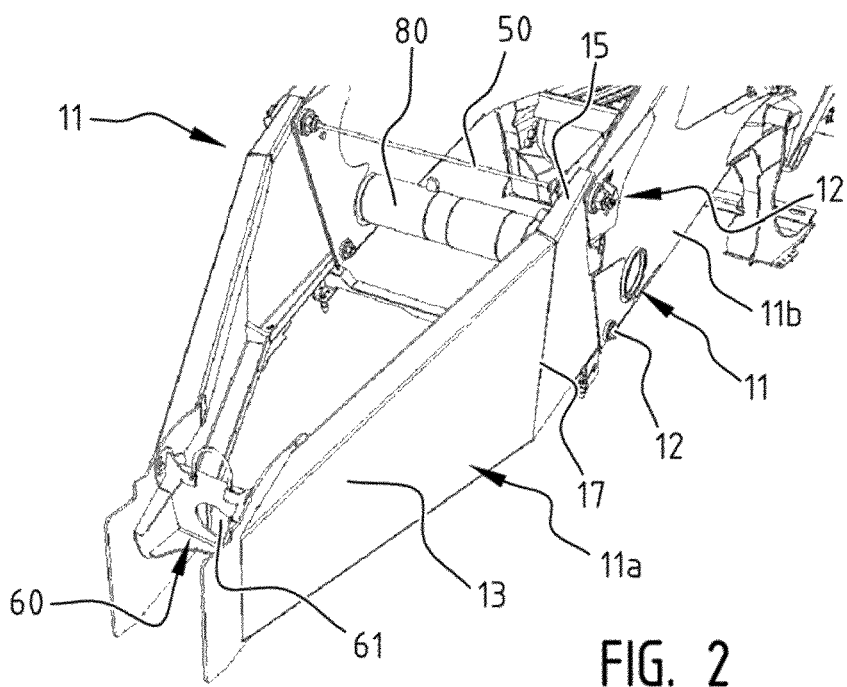
FIG. 2 is a perspective view of a front part of an embodiment of a baler, showing only parts which are relevant for illustrating embodiments of the invention.
Figure 3:
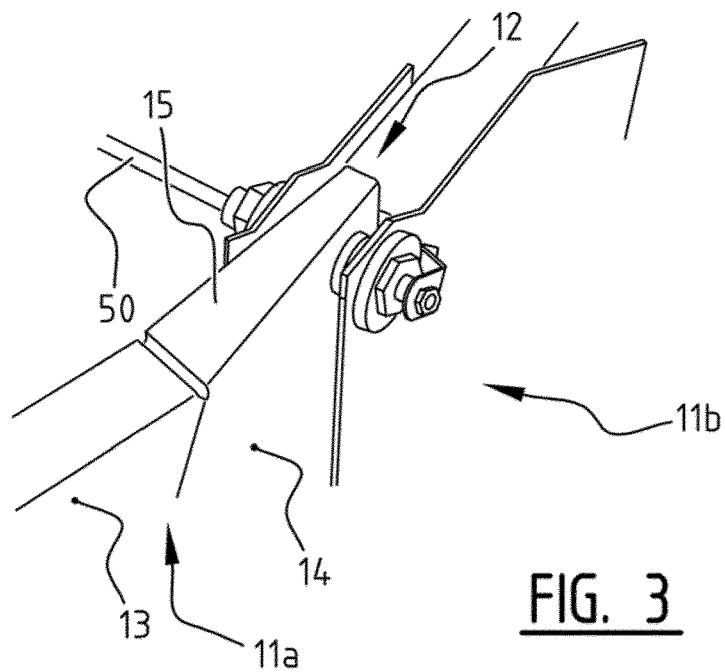
FIG. 3 is detailed perspective view of the connection of the pull rod to the sidewall for the embodiment of FIG. 2.

In the illustrated embodiment the first and second frame wall portions 11b are first and second double-walled portions, and the first and second pull wall portion 11a have a first and second edge, respectively, which is arranged between the walls of the first and second double walled portion, respectively, see FIGS. 2, 3 and 4. The first (second) hole 53 is a through-hole extending through the walls of the double walled portion 11b and through the edge of the pull wall portion 11a. The first and second pull wall portions 11a have a first and second upper edge 15 with a U-shape. A hollow cylindrical part 16 is fixed in the first and second U-shaped upper edge 15. These hollow cylindrical parts 16 may be e.g. welded in a hole in the pull wall portion 11a. The hollow pen 54 is arranged through holes 53a, 53b in the double-walled frame wall portion 11b and through the hollow cylindrical part 16, and is fixed with nut 56.

Figure 5:
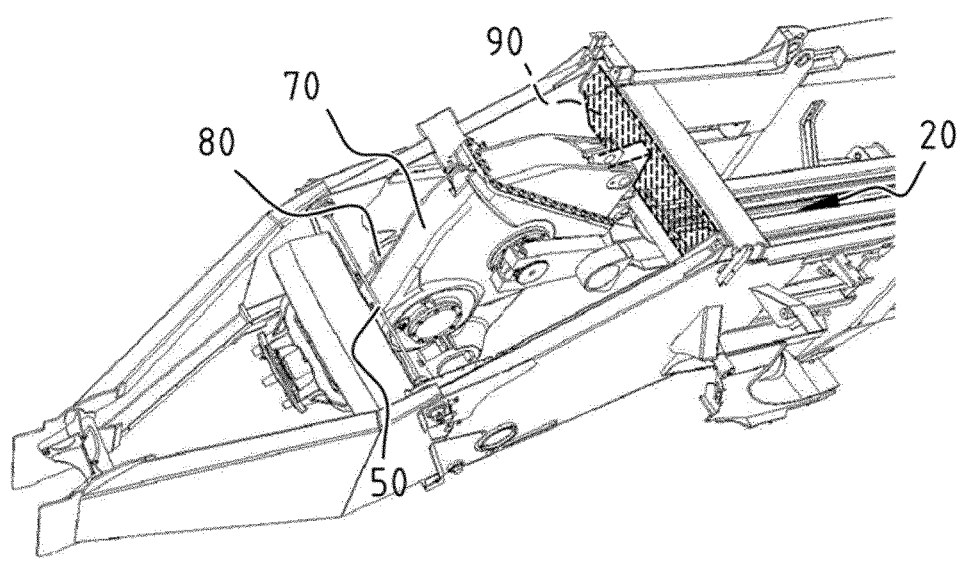
FIG. 5 is a perspective view similar to the view of FIG. 2 but showing some further parts that are mounted on the chassis.

As illustrated in FIG. 5, the baler further comprises a gearbox 70. A carrying member 80 carries a lower part of the gearbox 70 of the baler. The gearbox 70 provides actuation of the different parts of the baler that need to be actuated. The gearbox 70 may be actuated by a tractor pulling the baler by means of a transmission shaft between the tractor and the baler. The gearbox 70 provides a direct actuation of the plunger 20. The gearbox 70 is affixed at its lower part to the carrying member 80. The top part of the gearbox 70 is held in place by a linkage and sensor assembly connecting the top part thereof to a cross member 90 extending between the first and second sidewall 11. The carrying member 80 is preferably cylindrical, and is arranged between the first frame wall portion 11b and the second frame wall portion 11b, and the pull rod 50 is arranged higher than the carrying member 80, and, seen in a top view, closer to the front end 41 compared to the carrying member 80, see FIG. 5.

Whilst the principles of the invention have been set out above in connection with specific embodiments, it is to be understood that this description is merely made by way of example and not as a limitation of the scope of protection which is determined by the appended claims.

The invention claimed is:

1. A rectangular baler having a front end for connection with a tractor and a back end, the baler comprising:
a chassis comprising a first sidewall and a second sidewall;
a compacting plunger supported on the chassis for advancing crop material;
a bale chamber between the compacting plunger and the back end, the bale chamber adapted to contain one or more bales, the first and second sidewalls extending from the front end toward the back end; and
a pull rod connecting the first sidewall and the second sidewall, at a location between the plunger and the front end, the pull rod having a first and a second end part extending freely through a first hole in the first sidewall and a second hole in the second sidewall, respectively, the first and second end parts of the pull rod provided with a first blocking element and a second blocking element preventing that the first and second end parts move inwardly through the respective first and second holes while allowing that the first and second end parts move outwardly through the respective first and second holes;
wherein the first sidewall comprises a first pull wall portion at the front end and a first frame wall portion connected to the chassis,
wherein the second sidewall comprises a second pull wall portion at the front end and a second frame wall portion connected to the chassis,
wherein the first and second frame wall portions are connected at a connection area to the first and second pull wall portions, respectively,
wherein the first hole extends through the first pull wall portion and the first frame wall portion at the connection area, and
wherein the second hole extends through the second pull wall portion and the second frame wall portion at the connection area.

2. The rectangular baler of claim 1, wherein the pull rod connects an upper half of the first sidewall with an upper half of the second sidewall.

3. The rectangular baler of claim 1, wherein the pull rod connects a top part of the first sidewall with a top part of the second sidewall.

4. The rectangular baler of claim 1, wherein the first and second sidewalls each have a front end wall part and a back end wall part which is under an angle with respect to a front end wall part, such that the front end wall part of the first sidewall approaches the front end wall part of the second sidewall, when looking into the direction of the front end, wherein each front end wall part is connected via a transition area, in particular a bending line, to the corresponding back end wall part.

5. The rectangular baler of claim 1, wherein the first and second pull wall portions each have a first part which is bent with respect to a second part, the second part of the first and second pull wall portion being aligned with the first and second frame wall portions, respectively, such that the first parts constitute the front end wall parts and the second parts together with the first and second frame wall portions constitute the back end wall parts.

6. The rectangular baler of claim 4, wherein the distance between the pull rod and a plane through a transition zone of the first and second sidewalls is smaller than 75 cm, preferably smaller than 50 cm.

7. The rectangular baler of claim 1, wherein the first and second frame wall portions are first and second double-walled portions, and wherein the first and second pull wall portion have a first and second edge, respectively, which is arranged between the walls of the first and second double walled portions, respectively, wherein the first hole and the second hole is a through-hole extending through the walls of the first and second double walled portion and through the edge of the first and second pull wall portion, respectively.

8. The rectangular baler of claim 1, wherein the first and second pull wall portions have a first and second upper edge with a U-shape, wherein a hollow cylindrical part is fixed in the first and second U-shaped upper edges, and wherein the hollow cylindrical part of the first and second pull wall portion is part of the first and second holes, respectively.

9. The rectangular baler of claim 1, wherein the first and second sidewalls are connected at the front end via a reinforced plate-like element, which plate-like element is provided with a hole for a PTO drive shaft.

10. The rectangular baler of claim 1, further comprising a first hollow bolt and a second hollow bolt arranged in the first hole and the second hole, respectively, wherein the first and second end parts of the pull rod extend through the first and second bolts, respectively.

11. The rectangular baler of claim 1, wherein the first and second blocking elements each comprise at least one nut.

12. The rectangular baler of claim 1, further comprising a gearbox, wherein there is provided a carrying member between the first sidewall and the second sidewall, the carrying member carrying a lower part of the gearbox.

13. The rectangular baler of claim 12, wherein the carrying member is arranged between the first sidewall and the second sidewall, wherein the pull rod is arranged higher than the carrying member, and, seen in a top view, closer to the front end than the carrying member.

14. The rectangular baler of claim 1, wherein the pull rod has a diameter which is smaller than 30 mm.

15. A rectangular baler having a front end for connection with a tractor and a back end, the baler comprising:
a chassis comprising a first sidewall and a second sidewall;
a compacting plunger supported on the chassis for advancing crop material;
a bale chamber between the compacting plunger and the back end, the bale chamber adapted to contain one or more bales, the first and second sidewalls extending from the front end toward the back end;
a pull rod connecting the first sidewall and the second sidewall, at a location between the plunger and the front end, the pull rod having a first and a second end part extending freely through a first hole in the first sidewall and a second hole in the second sidewall, respectively, the first and second end parts of the pull rod provided with a first blocking element and a second blocking element preventing that the first and second end parts move through the first and second holes, respectively; and
a first hollow bolt and a second hollow bolt arranged in the first hole and the second hole, respectively;
wherein the first and second end parts of the pull rod extend through the first and second bolt, respectively,
wherein the first sidewall comprises a first pull wall portion at the front end and a first frame wall portion connected to the chassis,
wherein the second sidewall comprises a second pull wall portion at the front end and a second frame wall portion connected to the chassis,
wherein the first and second frame wall portions are connected at a connection area to the first and second pull wall portions, respectively,
wherein the first hole extends through the first pull wall portion and the first frame wall portion at the connection area, and
wherein the second hole extends through the second pull wall portion and the second frame wall portion at the connection area.

16. A rectangular baler having a front end for connection with a tractor and a back end, the baler comprising:
a chassis comprising a first sidewall and a second sidewall;
a compacting plunger supported on the chassis for advancing crop material;
a bale chamber between the compacting plunger and the back end, the bale chamber adapted to contain one or more bales, the first and second sidewalls extending from the front end toward the back end; and
a pull rod connecting the first sidewall and the second sidewall, at a location between the plunger and the front end, the pull rod having a first and a second end part extending freely through a first hole in the first sidewall and a second hole in the second sidewall, respectively, the first and second end parts of the pull rod provided with a first blocking element and a second blocking element preventing that the first and second end parts move through the first and second holes, respectively;
wherein the first and second blocking elements each comprise at least one nut,
wherein the first sidewall comprises a first pull wall portion at the front end and a first frame wall portion connected to the chassis,
wherein the second sidewall comprises a second pull wall portion at the front end and a second frame wall portion connected to the chassis,
wherein the first and second frame wall portions are connected at a connection area to the first and second pull wall portions, respectively,
wherein the first hole extends through the first pull wall portion and the first frame wall portion at the connection area, and
wherein the second hole extends through the second pull wall portion and the second frame wall portion at the connection area.

* * * * *